Oct. 16, 1923.
C. C. FARMER
1,471,116
DOOR AND BRAKE CONTROL EQUIPMENT
Filed Oct. 16, 1922
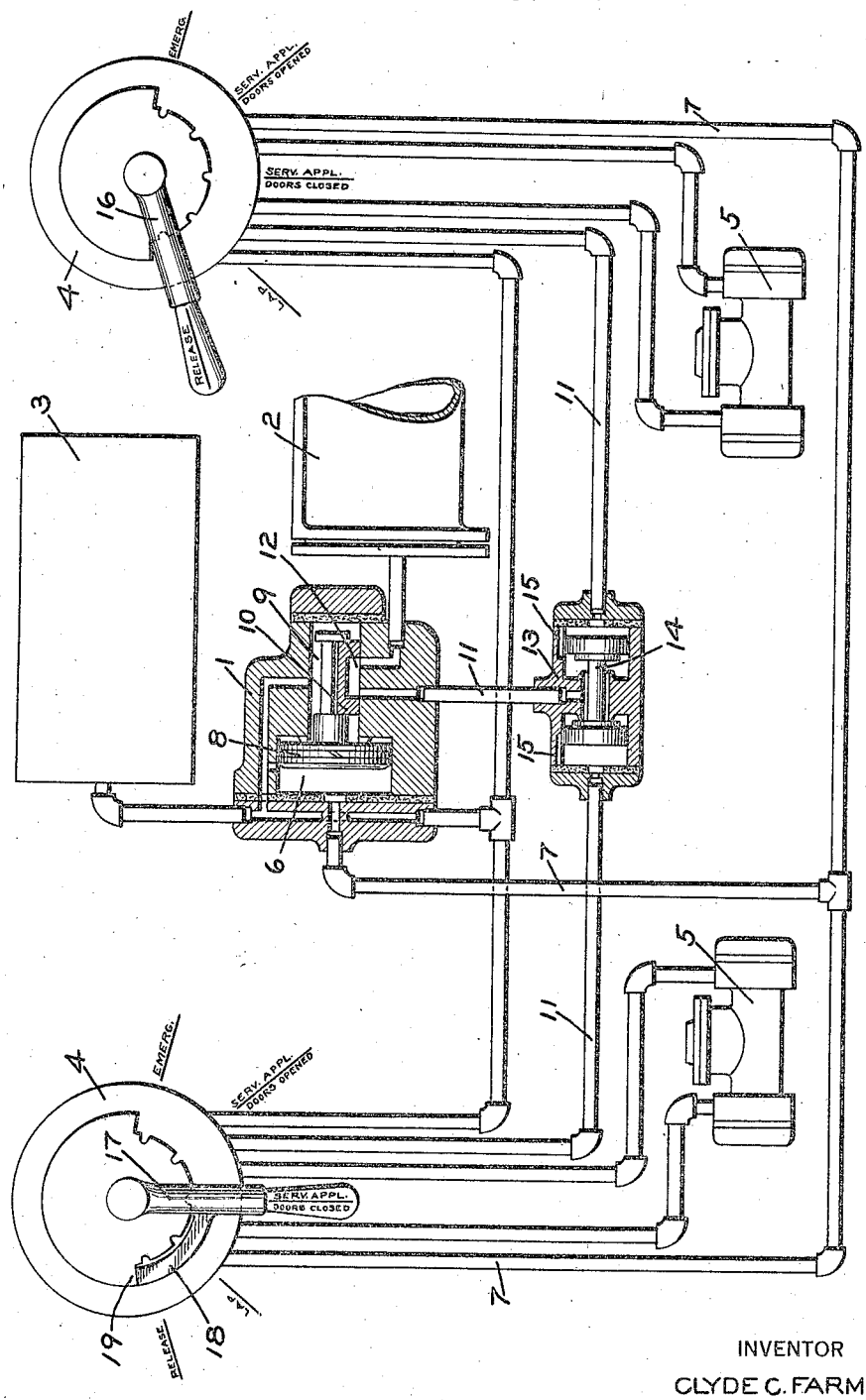
INVENTOR
CLYDE C. FARMER
BY *Wm. M. Cady*
ATTORNEY Patented Oct. 16, 1923.

1,471,116

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

DOOR AND BRAKE CONTROL EQUIPMENT.

Application filed October 16, 1922. Serial No. 594,787.

*To all whom it may concern:*

Be it known that I, CLYDE C. FARMER, a citizen of the United States, residing at Pittsburgh, in the county of Allegheny and State of Pennsylvania, have invented new and useful Improvements in Door and Brake Control Equipments, of which the following is a specification.

This invention relates to fluid pressure brake and car door controlling apparatus, and more particularly to a double end equipment.

The principal object of my invention is to provide an equipment of the above character having means by which the conductor may operate the doors at the non-operating end of the car, without interfering with the control of the car by the motorman at the operating end of the car.

In the accompanying drawing, the single figure is a diagrammatic view, partly in section, of a car door and brake controlling equipment embodying my invention. As shown in the drawing, the equipment may comprise an emergency valve device 1, a brake cylinder 2, a main reservoir 3, a brake valve device 4 at opposite ends of the car, and a door engine 5 for controlling the car doors at each end of the car.

The emergency valve device 1 may be of the usual construction comprising a casing having a piston chamber 6 connected to emergency brake pipe 7 and containing a piston 8 and a valve chamber 9 connected to the main reservoir 3 and containing a slide valve 10.

In the normal release position of the emergency valve device 1, the brake cylinder 2 is connected to the straight air pipe 11 through a cavity 12 in slide valve 10.

Interposed in the straight air pipe 11 so as to control communication through the straight air pipe from either brake valve device 4 to the brake cylinder 2 is a double check valve device comprising a casing 13 containing a double check valve 14. When the double check valve seats in either of its opposite positions, communication is established through a groove 15 around one piston head from one brake valve device through the straight air pipe 11 to the brake cylinder while communication from the other brake valve device through the straight air pipe to the brake cylinder is cut off by the double check valve.

The brake valve device 4 may have the usual positions for this type of equipment, such as release, lap, service application with the doors closed, service application with the doors open, and emergency application position.

The motorman's brake valve handle 16 shown applied to the brake valve device 4 at the right of the drawing, may be of the usual construction, but the conductor's door controlling handle 17 shown applied to the brake valve device 4 at the left of the drawing is specially constructed with a lug 18 which is adapted to engage an abutment or stop 19 provided on the brake valve device 4 in the service application, doors closed position, so that the conductor's handle cannot be moved to the left to either lap or release positions.

In operation, when the motorman leaves one end of the car, say the left hand end as shown in the drawing, he removes the motorman's handle in the handle off position, which is also the service application, doors closed position. In this position, the brake valve makes port connections for supplying fluid under pressure to the straight air pipe 11 and also effects the operation of the corresponding door engine 5 so as to close the car doors at that end of the car. At the operating end of the car he then applies the handle to the brake valve device at that end of the car and turns same to release position as shown at the right of the drawing. Fluid in the straight air pipe from the double check valve device to the operating brake valve is then vented to the atmosphere and the double check valve 14 will be shifted to the position shown in the drawing by the fluid pressure supplied to the straight air pipe from the non-operating brake valve. Communication from the brake valve at the non-operating end to the brake cylinder is thus cut off, while communication from the brake cylinder 2 is opened through the groove 15 around the right hand piston head of the double check valve 14 to the straight air connection to the operating brake valve device at the right, so that any fluid in the brake cylinder 2 is released.

The brakes may now be controlled by the motorman at the operating end in the usual manner, the double check valve 14 being held in the position shown, so that fluid under pressure can be supplied to and released from the brake cylinder through the double check valve groove 15 at the right.

At the non-operating end of the car, the conductor may control the car doors at that end by applying the conductor's handle 17. If the conductor moves the handle to the service application, doors open position, the corresponding door engine 5 will be operated to effect the opening of the car doors at the non-operating end and when the handle is in the service application, doors closed position, the door engine will be operated to close the car doors. The conductor may also move the handle to emergency position, in which fluid is vented from the emergency brake pipe 7 so as to cause the operation of the emergency valve device 1 and thereby effect an emergency application of the brakes in the usual manner.

The stop lug 18, however, prevents the movement of the conductor's handle 17 to either lap or release positions and the object of this is to prevent any possible release of fluid from the straight air pipe at the non-operating end by exhaust in the release position or by leakage in lap position. It is important to maintain the fluid pressure on the double check valve 14 at the non-operating end of the car, as otherwise, the double check valve might be shifted so as to cut off communication from the brake valve device at the operating end of the car and thus prevent the control of the brakes by the motorman, which would obviously be a dangerous condition.

Having now described my invention, what I claim as new and desire to secure by Letters Patent, is:—

1. In a double end fluid pressure brake equipment, the combination with a brake cylinder and a straight air pipe through which fluid is supplied to the brake cylinder, of a brake valve device at each end of the car having a position for supplying fluid under pressure to and a position for releasing fluid from the straight air pipe, a double check valve device operated by fluid supplied through the brake valve at the non-operating end of the car for establishing communication from the brake valve at the operating end through the straight air pipe to the brake cylinder, and a handle for operating said brake valve at the non-operating end having means for preventing movement to the release position.

2. In a double end fluid pressure brake equipment, the combination with a brake cylinder, a straight air pipe, and a brake valve device at each end of the car, of a double check valve device operated by fluid supplied through the straight air pipe from the brake valve at one end for establishing communication from the brake valve at the other end through the straight air pipe to the brake cylinder and a handle for operating the brake valve having means for preventing movement of the brake valve to a position for releasing fluid from the straight air pipe.

3. In a double end fluid pressure brake equipment, the combination with a brake cylinder, a straight air pipe, and a brake valve device at each end of the car, of a double check valve device operated by fluid supplied through the straight air pipe from the brake valve at one end for establishing communication from the brake valve at the other end through the straight air pipe to the brake cylinder, a handle for operating the brake valve device at one end of the car to supply and release fluid to and from the straight air pipe, and a handle for operating the brake valve device at the other end of the car having means for preventing movement of the brake valve device to a position for releasing fluid from the straight air pipe.

4. In a double end fluid pressure brake equipment, the combination with a brake cylinder, a straight air pipe, and a brake valve device at each end of the car, of a double check valve device operated by fluid supplied through the straight air pipe from the brake valve at one end for establishing communication from the brake valve at the other end through the straight air pipe to the brake cylinder, a handle for moving the brake valve device to a position for supplying fluid to the brake cylinder, a position for releasing fluid from the brake cylinder, and to a lap position, and a handle for operating the brake valve device having means for preventing movement of the brake valve device to release and lap positions.

In testimony whereof I have hereunto set my hand.

CLYDE C. FARMER.